United States Patent
Fitzer et al.

(10) Patent No.: US 11,212,366 B2
(45) Date of Patent: Dec. 28, 2021

(54) KUBERNETES AS A DISTRIBUTED OPERATING SYSTEM FOR MULTITENANCY/MULTIUSER

(71) Applicant: SAP SE, Walldorf (DE)

(72) Inventors: Joachim Fitzer, Schriesheim (DE); Pietro Francesco Menna, Sao Leopoldo (BR); Felipe Musse, Porto Alegre (BR); Simon Seif, Ostringen (DE)

(73) Assignee: SAP SE, Walldorf (DE)

( * ) Notice: Subject to any disclaimer, the term of this patent is extended or adjusted under 35 U.S.C. 154(b) by 204 days.

(21) Appl. No.: 16/216,602

(22) Filed: Dec. 11, 2018

(65) Prior Publication Data
US 2020/0186616 A1    Jun. 11, 2020

(51) Int. Cl.
| | |
|---|---|
| *H04L 12/911* | (2013.01) |
| *G06F 9/50* | (2006.01) |
| *G06Q 30/02* | (2012.01) |
| *H04W 4/08* | (2009.01) |
| *H04L 29/08* | (2006.01) |
| *H04L 29/06* | (2006.01) |
| *G06F 16/955* | (2019.01) |
| *G06F 9/455* | (2018.01) |

(Continued)

(52) U.S. Cl.
CPC ........ *H04L 67/327* (2013.01); *G06F 9/45558* (2013.01); *G06F 9/5072* (2013.01); *G06F 9/544* (2013.01); *G06F 16/9014* (2019.01); *G06F 16/955* (2019.01); *H04L 63/102* (2013.01); *H04L 67/10* (2013.01)

(58) Field of Classification Search
CPC ..... H04L 67/327; H04L 63/102; H04L 67/10; G06F 16/955; G06F 16/9014; G06F 9/45558; G06F 9/5072; G06F 9/544
See application file for complete search history.

(56) References Cited

U.S. PATENT DOCUMENTS

| | | | |
|---|---|---|---|
| 9,396,277 B2 * | 7/2016 | Lehman | ................. G06F 16/27 |
| 10,013,189 B1 | 7/2018 | Yang et al. | |

(Continued)

OTHER PUBLICATIONS

"U.S. Appl. No. 16/220,802, Examiner Interview Summary dated Mar. 24, 2020", 3 pgs.

(Continued)

*Primary Examiner* — Esther B. Henderson
*Assistant Examiner* — Nazia Naoreen
(74) *Attorney, Agent, or Firm* — Schwegman Lundberg & Woessner, P.A.

(57) ABSTRACT

A client device sends a connection request to a virtual system in a Kubernetes cluster. The connection request identifies the client device and the application to which the request pertains. Based on a tenant associated with the client device, the virtual system connects the client device to an instance of the application. The instance of the application has access to data for the tenant but not for other tenants. Another client device of the tenant sends another connection request to the virtual system for a connection to another application. Because the tenant is the same, the instance of the other application may access the same data as the instance of the first application. In this way, applications for a single tenant may share data while maintaining the security of the data from other tenants.

20 Claims, 11 Drawing Sheets

(51) Int. Cl.
*G06F 9/54* (2006.01)
*G06F 16/901* (2019.01)

(56) References Cited

U.S. PATENT DOCUMENTS

| | | | |
|---|---|---|---|
| 10,594,582 | B2 | 3/2020 | Joshi et al. |
| 10,778,540 | B2 | 9/2020 | Fitzer et al. |
| 2007/0143398 | A1 | 6/2007 | Graham |
| 2011/0125821 | A1 | 5/2011 | Roshen |
| 2014/0130036 | A1 | 5/2014 | Gurikar et al. |
| 2015/0051930 | A1 | 2/2015 | Yamaguchi et al. |
| 2015/0113009 | A1 | 4/2015 | Zhou et al. |
| 2015/0142878 | A1 | 5/2015 | Hebert et al. |
| 2016/0112497 | A1 | 4/2016 | Koushik et al. |
| 2017/0111241 | A1 | 4/2017 | Degioanni |
| 2017/0353444 | A1* | 12/2017 | Karangutkar ......... H04L 63/102 |
| 2018/0088935 | A1 | 3/2018 | Church et al. |
| 2018/0152534 | A1 | 5/2018 | Kristiansson et al. |
| 2018/0247064 | A1 | 8/2018 | Aronovich et al. |
| 2018/0367528 | A1 | 12/2018 | Schwarz et al. |
| 2019/0065323 | A1 | 2/2019 | Dhamdhere et al. |
| 2019/0102280 | A1 | 4/2019 | Caldato et al. |
| 2019/0190771 | A1 | 6/2019 | Fang |
| 2019/0324786 | A1 | 10/2019 | Ranjan et al. |
| 2019/0356661 | A1 | 11/2019 | Hecht |
| 2020/0026587 | A1* | 1/2020 | Gupta ..................... G06F 8/60 |
| 2020/0028848 | A1* | 1/2020 | Gupta ................ H04L 63/0823 |
| 2020/0076685 | A1 | 3/2020 | Vaidya et al. |
| 2020/0104161 | A1* | 4/2020 | Kapur ................. G06F 11/0712 |
| 2020/0186441 | A1 | 6/2020 | Fitzer et al. |
| 2020/0186443 | A1 | 6/2020 | Fitzer et al. |
| 2020/0195525 | A1 | 6/2020 | Fitzer et al. |

OTHER PUBLICATIONS

"U.S. Appl. No. 16/216,570, Examiner Interview Summary dated Mar. 26, 2020", 3 pgs.
"U.S. Appl. No. 16/220,802, Response filed Mar. 30, 2020 to Non Final Office Action dated Feb. 19, 2020", 11 pgs.
"U.S. Appl. No. 16 214,581, Non Final Office Action dated Apr. 1, 2020", 5 pgs.
"Kubernetes", Wikipedia, [Online], Retrieved from the Internet: URL: https: en.wikipedia.org w index.php?title=Kubernetesandoldid= 872771944, (Dec. 9, 2018), 11 pgs.
"U.S. Appl. No. 16/214,581, Response filed Apr. 28, 2020 to Non Final Office Action dated Apr. 1, 2020", 18 pgs.
"U.S. Appl. No. 16/216,570, Response filed May 4, 2020 to Non Final Office Action dated Feb. 5, 2020", 11 pgs.
"U.S. Appl. No. 16/214,581, Notice of Allowance dated May 12, 2020", 7 pgs.
"U.S. Appl. No. 16/220,802, Final Office Action dated Jun. 2, 2020", 19 pgs.
"U.S. Appl. No. 16/220,802, Response filed Jun. 18, 20 to Final Office Action dated Jun. 2, 2020", 8 pgs.
"U.S. Appl. No. 16/216,570, Non Final Office Action dated Feb. 5, 2020", 19 pgs.
"U.S. Appl. No. 16/216,570, Final Office Action dated Aug. 18, 2020", 23 pgs.
"U.S. Appl. No. 16/220,802, Examiner Interview Summary dated Jun. 24, 2020", 4 pgs.
"U.S. Appl. No. 16/220,802, Non Final Office Action dated Aug. 17, 2020", 17 pgs.
"U.S. Appl. No. 16/220,802, Non Final Office Action dated Feb. 19, 2020".
"U.S. Appl. No. 16/216,570, Examiner Interview Summary dated Oct. 13, 2020", 3 pgs.
"U.S. Appl. No. 16/216,570, Response filed Oct. 14, 20 to Final Office Action dated Aug. 18, 2020", 11 pgs.
"U.S. Appl. No. 18/220,802, Corrected Notice of Allowability dated Sep. 28, 2020", 6 pgs.
"U.S. Appl. No. 18/220,802, Examiner Interview Summary dated Sep. 2, 2020", 3 pgs.
"U.S. Appl. No. 18/220,802, Notice of Allowance dated Sep. 16, 2020", 10 pgs.
"U.S. Appl. No. 16/220,802, Response filed Aug. 27, 20 to Non Final Office Action dated Aug. 17, 2020", 10 pgs.

* cited by examiner

TENANT TABLE (600, 605)

| CLIENT ID | TENANT ID |
|---|---|
| 10.10.1.0 | A |
| 198.1.1.4 | B |
| 198.1.1.5 | B |

TENANT ROUTING TABLE (620)

| TENANT ID | APPLICATION NAME | APPLICATION INSTANCE |
|---|---|---|
| A | PIPELINE-MODELER | PIPELINE-MODELER A |
| A | ACCOUNTING | ACCOUNTING A |
| B | PIPELINE-MODELER | PIPELINE-MODELER B |
| B | ACCOUNTING | ACCOUNTING B |

ROUTING TABLE (635)

| CLIENT ID | TENANT ID | APPLICATION NAME | APPLICATION INSTANCE |
|---|---|---|---|
| USER1 | A | PIPELINE-MODELER | PIPELINE-MODELER A |
| USER1 | B | PIPELINE-MODELER | PIPELINE-MODELER B |

HASH ROUTING TABLE (650)

| HASH | APPLICATION INSTANCE |
|---|---|
| 1358F740AC91 | PIPELINE-MODELER A |
| 23EF9023ABD2 | PIPELINE-MODELER B |

*FIG. 6*

KUBERNETES AS A DISTRIBUTED OPERATING SYSTEM FOR MULTITENANCY/MULTIUSER

TECHNICAL FIELD

The subject matter disclosed herein generally relates to multitenancy environments. Specifically, the present disclosure addresses systems and methods to use Kubernetes as a distributed operating system for realizing a multitenancy/multiuser environment.

BACKGROUND

Kubernetes is a system for automating deployment, scaling, and management of containerized applications. Application containerization is a virtualization method used by operating systems to deploy and run distributed applications without launching an entire virtual machine for each application.

Containerized applications have advantages over standard applications. When a standard application is installed on a server, libraries required by the application are also installed. Thus, if multiple applications are installed, the libraries on the server are an amalgamation of the libraries required by each of the multiple applications. If one application installs a different version of a library used by another application, the first installed version is overwritten. As a result, an application may use a version of a library that was not tested with the application, which may further result in unexpected behavior.

One solution to this problem is to run each application in a virtual machine that only has the operating system and the application installed. This ensures that different applications will not cause problems for each other. However, virtual machines have substantial overhead associated with them. As a result, to achieve the same performance as with a standard, non-virtual, deployment, additional or higher-performing computing hardware will be required, increasing costs.

Kubernetes provides another solution in the form of containerized applications. Each container comprises an application and its libraries, but the containers are installed and managed with much less overhead than virtual machines.

Multitenancy is a software architecture in which multiple instances of a software application operate in a shared environment. The instances are logically separated. Multiuser software is software that allows access by multiple users in a single instance of the software. An architecture that allows for both multitenancy and multiple users within each of the multiple instances is a multitenancy/multiuser environment.

BRIEF DESCRIPTION OF THE DRAWINGS

Some embodiments are illustrated by way of example and not limitation in the figures of the accompanying drawings.

FIG. 6 is a block diagram of a database schema suitable for use in a Kubernetes cluster acting as a distributed operating system that provides a multitenancy/multiuser environment, according to some example embodiments.

DETAILED DESCRIPTION

Example methods and systems are directed to using Kubernetes as a distributed operating system for a multitenancy/multiuser environment. A client device sends a connection request to a virtual system in a Kubernetes cluster. The connection request identifies the client device and a tenant for the client device as well as the application to which the request pertains. Based on the tenant, the virtual system connects the client device to an instance of the application. The instance of the application has access to data for the tenant but not for other tenants. Similarly, instances of the application for other tenants do not have access to the data for the tenant. A tenant is a group of users who share a common access, with some privileges, to a software instance. As an example, a tenant may be a group of employees of a company.

Another client device of the tenant sends another connection request to the virtual system for a connection to another application. Because the tenant is the same, the instance of the other application may access the same data as the instance of the first application. In this way, applications for a single tenant may share data while maintaining the security of the data from other tenants.

From the perspective of a Kubernetes master of the Kubernetes cluster, the virtual system is an ordinary application. Thus, the Kubernetes cluster itself can be used to implement the methods and systems described herein without modification.

By comparison with existing methods of using Kubernetes applications, the methods and systems discussed herein improve the security of data by supporting a multitenancy/multiuser environment. By comparison with existing methods of supporting a multitenancy/multiuser environment, the methods and systems discussed herein improve the ease of deployment and leverage Kubernetes' ability to deploy applications across multiple nodes. When these effects are considered in aggregate, one or more of the methodologies described herein may obviate a need for certain efforts or resources that otherwise would be involved in supporting a multitenancy/multiuser environment. Computing resources used by one or more machines, databases, or networks may similarly be reduced. Examples of such computing resources include processor cycles, network traffic, memory usage, data storage capacity, power consumption, and cooling capacity.

Figure 1:
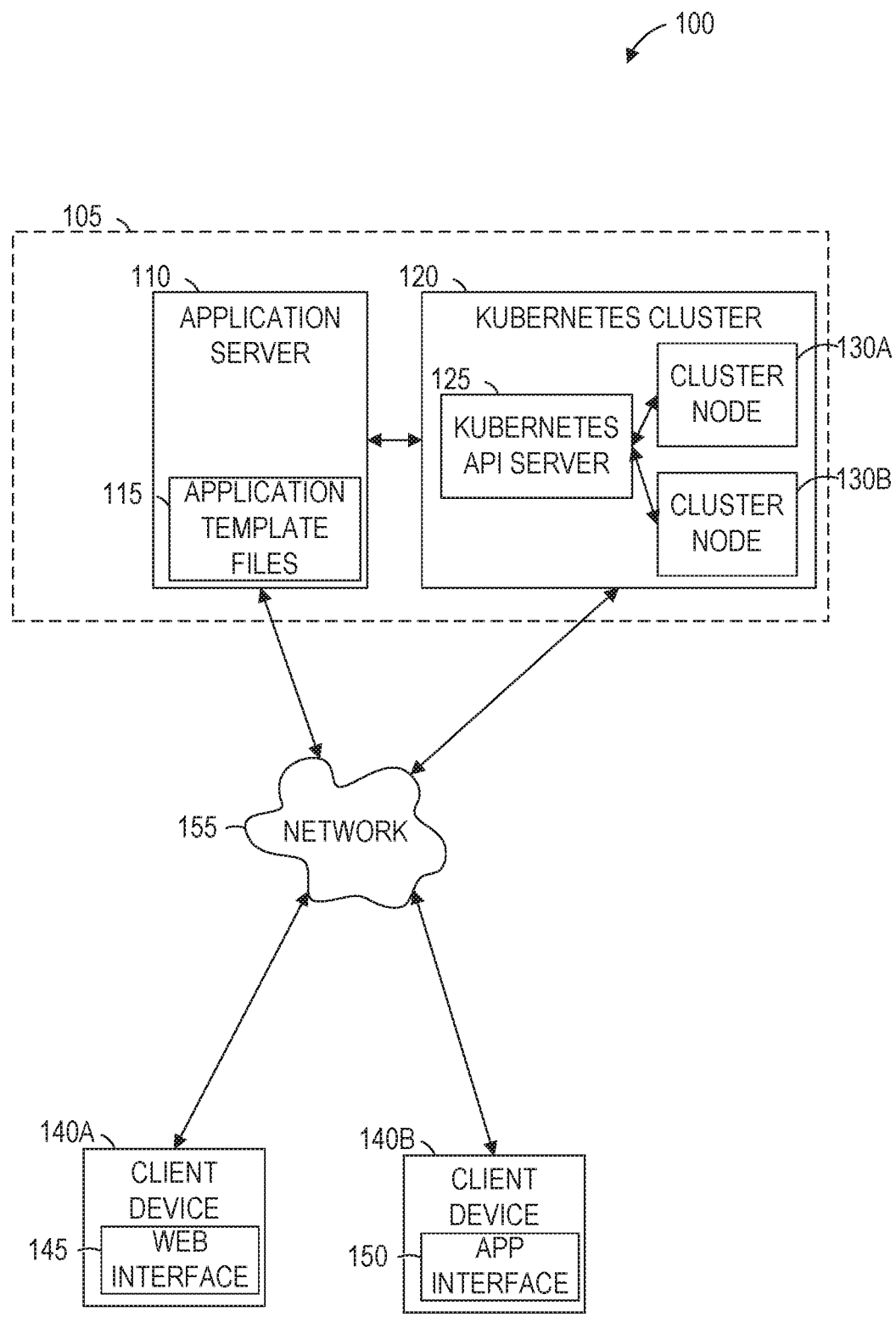
FIG. 1 is a network diagram illustrating a network environment suitable for using Kubernetes as a distributed operating system for a multitenancy/multiuser environment, according to some example embodiments.

FIG. 1 is a network diagram illustrating a network environment 100 suitable for using Kubernetes as a distributed operating system for a multitenancy/multiuser environment, according to some example embodiments. The network environment 100 includes a network-based application 105, client devices 140A and 140B, and a network 155. The network-based application 105 is provided by an application server 110 in communication with a Kubernetes cluster 120. The application server 110 accesses application template files 115 to configure and deploy an application to the Kubernetes cluster 120 via a Kubernetes application programming interface (API) server 125 interacting with a set of cluster nodes 130A, 130B. The containerized application is provided to the client devices 140A and 140B via a web interface 145 or an application interface 150. The application server 110, the Kubernetes API server 125, the cluster nodes 130A and 130B, and the client devices 140A and 140B may each be implemented in a computer system, in whole or in part, as described below with respect to FIG. 11. The cluster nodes 130A and 130B may be referred to collectively as the cluster nodes 130 or generically as a cluster node 130. The client devices 140A and 140B may be referred to collectively as client devices 140 or generically as a client device 140.

The application server 110 provides a user interface for selecting an application to the client devices 140. The Kubernetes API server 125 provides an interface to the Kubernetes cluster 120 and deploys applications to the cluster nodes 130. The selected application may be invoked via a virtual system application. The client device 140 may provide identifying information to the application server 110, and the identifying information may be used by the Kubernetes API server 125 or the virtual system application to determine a particular instance of the selected application to invoke.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 110, the Kubernetes API server 125, the cluster nodes 130A-130B, and the client devices 140A-140B may be connected by the network 155. The network 155 may be any network that enables communication between or among machines, databases, and devices. Accordingly, the network 155 may be a wired network, a wireless network (e.g., a mobile or cellular network), or any suitable combination thereof. The network 155 may include one or more portions that constitute a private network, a public network (e.g., the Internet), or any suitable combination thereof.

Figure 2:
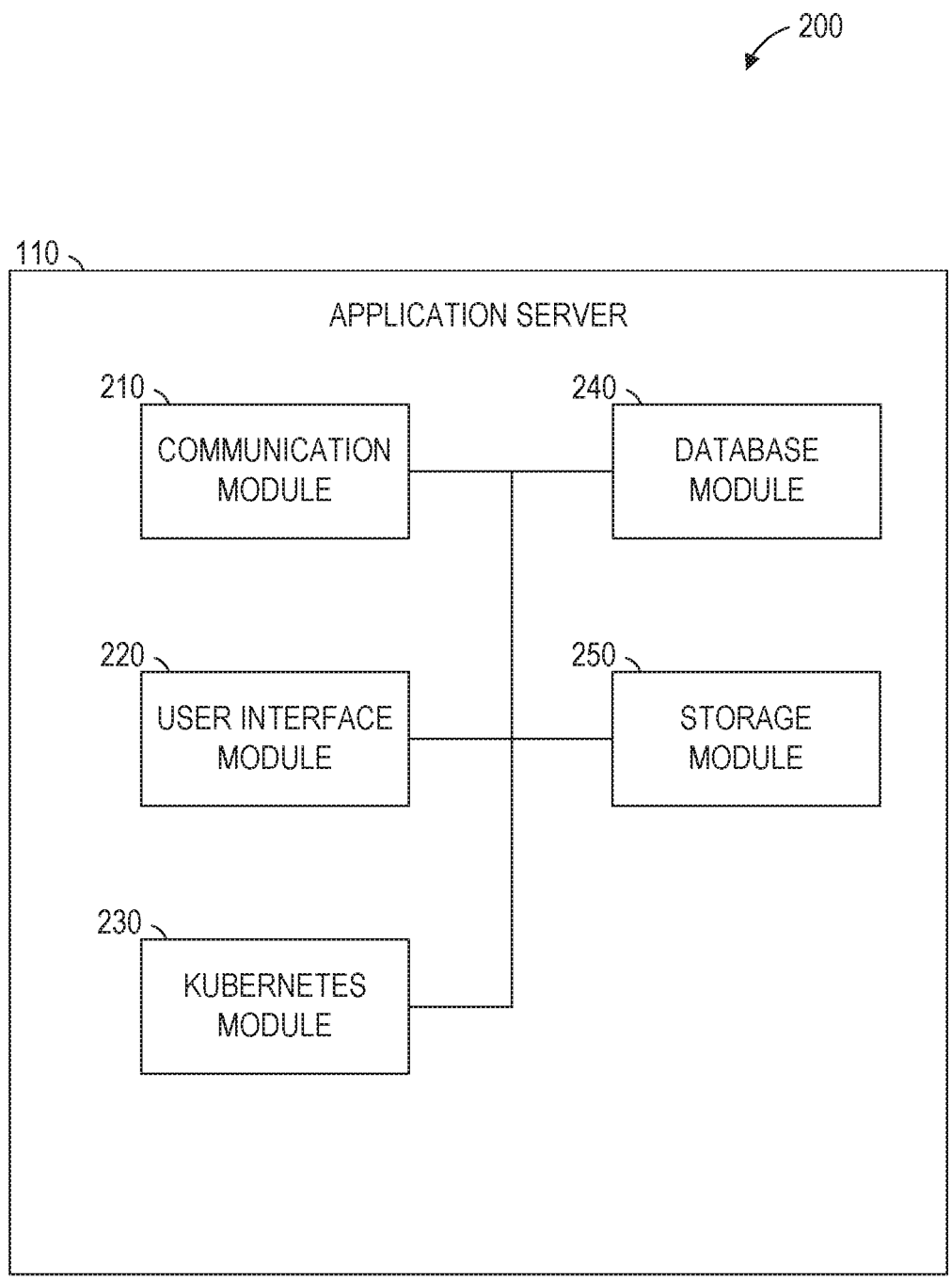
FIG. 2 is a block diagram of an application server, according to some example embodiments, suitable for using Kubernetes as a distributed operating system for a multitenancy/multiuser environment.

FIG. 2 is a block diagram 200 illustrating components of the application server 110, according to some example embodiments. The application server 110 is shown as including a communication module 210, a user interface module 220, a Kubernetes module 230, a database module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the application server 110 and transmits data from the application server 110. For example, the communication module 210 may receive, from the client device 140A, data (e.g., a file in a standardized format) for a selected application. The communication module 210 provides the data to the Kubernetes module 230. The Kubernetes module 230 communicates with the Kubernetes API server 125 to cause one or more of the cluster nodes 130, via a virtual system application, to execute the application. The cluster nodes 130 executing the application communicate with the client device 140A via the network 155 to provide the selected application. In some example embodiments, data from the file is stored in a database via the database module 240 and the storage module 250. After being stored, the data may be accessed from the database. The communication module 210 may transmit a user interface from the user interface module 220 to the client device 140A that includes data for available applications. The list of available applications may be generated by accessing a manifest file that identifies the available applications, by accessing a directory that contains the files, in a standardized format, for the available applications, by accessing a table in a database that contains entries for the available applications, or any suitable combination thereof. Communications sent and received by the communication module 210 may be intermediated by the network 155.

The user interface module 220 causes presentation of a user interface for the application server 110 on a display associated with the client device 140A or 140B. The user interface allows a user to select an application from a list of applications, to interact with an application, or any suitable combination thereof.

Figure 3:
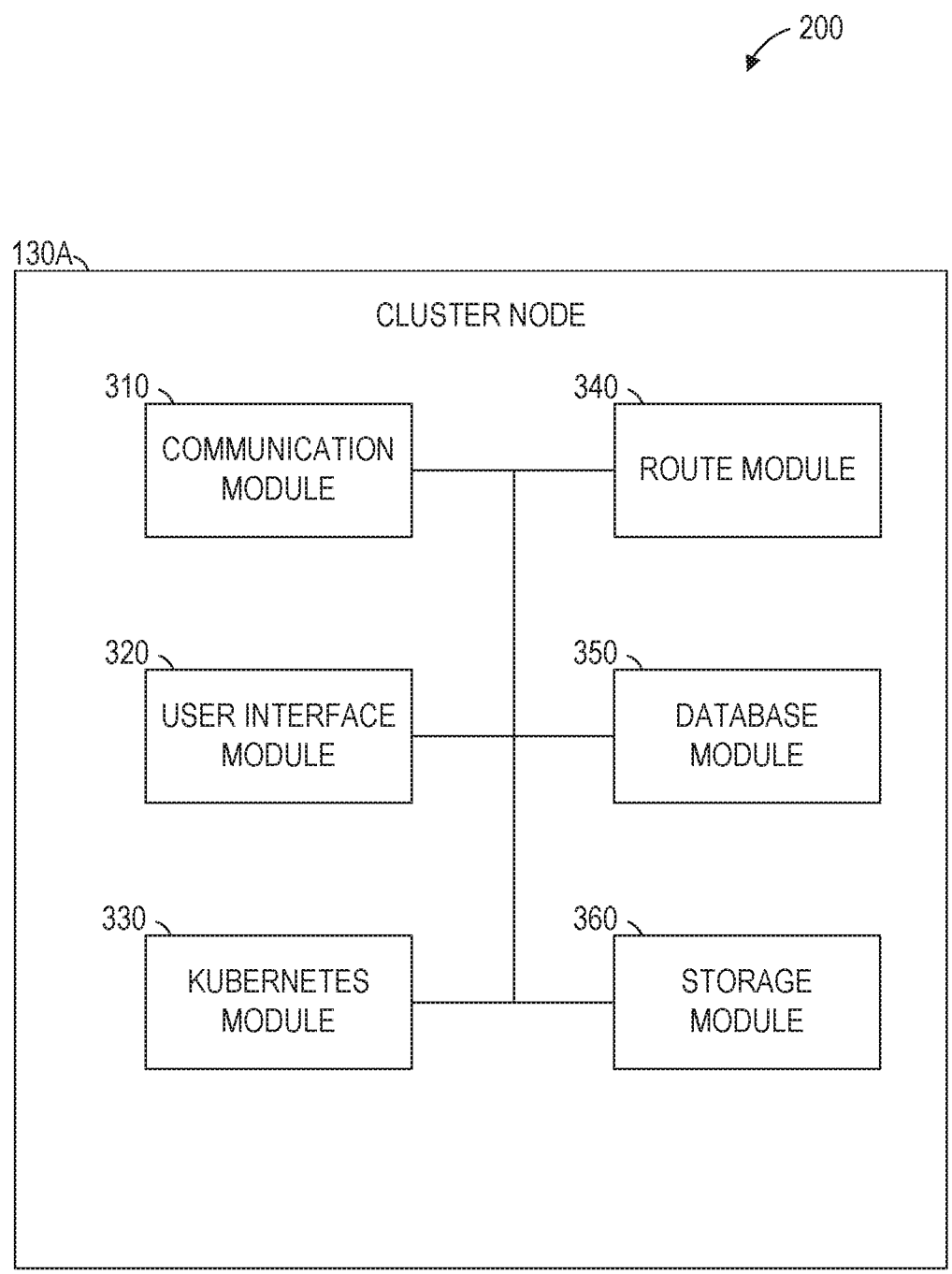
FIG. 3 is a block diagram of a cluster node, according to some example embodiments, suitable for using Kubernetes as a distributed operating system for a multitenancy/multiuser environment.

FIG. 3 is a block diagram 300 illustrating components of the cluster node 130A, according to some example embodiments. The cluster node 130A is shown as including a communication module 310, a user interface module 320, a Kubernetes module 330, a route module 340, a database module 350, and a storage module 360, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 receives data sent to the cluster node 130A and transmits data from the cluster node 130A. For example, the communication module 310 may receive, from the Kubernetes API server 125, a request to use an application via a virtual system. The request may identify a user, a client device, a tenant, or any suitable combination thereof. The communication module 310 provides the data to the Kubernetes module 330. The route module 340, invoked by the Kubernetes module 330, determines which instance of the application to connect the client device to. The cluster node 130A, executing the instance of the application, communicates with the client device 140A via the network 155 to provide the application. In some example embodiments, data for the tenant is stored in a database via the database module 350 and the storage module 360. After being stored, the data may be accessed from the database. The communication module 310 may transmit a user interface from the user interface module 320 to the client device 140A that includes data for the application instance. Communications sent and received by the communication module 310 may be intermediated by the network 155.

The user interface module 320 causes presentation of a user interface for the cluster node 130A on a display associated with the client device 140A or 140B. The user interface allows a user to interact with the application instance.

Figure 4:
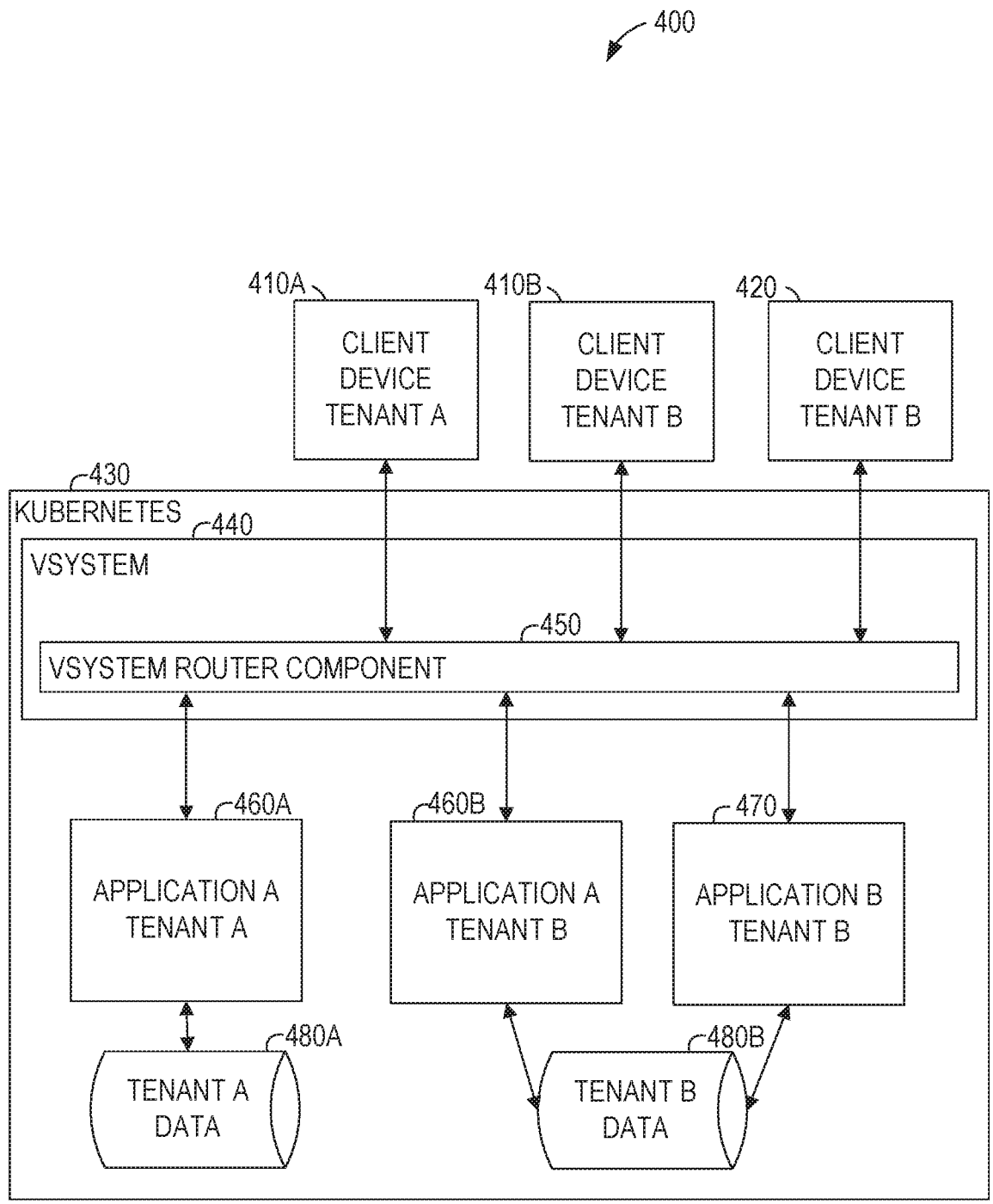
FIG. 4 is a block diagram of client devices in communication with a Kubernetes cluster acting as a distributed operating system that provides a multitenancy/multiuser environment, according to some example embodiments.

FIG. 4 is a block diagram 400 of client devices 410A, 410B, and 420 in communication with a Kubernetes cluster 430 acting as a distributed operating system that provides a multitenancy/multiuser environment, according to some example embodiments. The Kubernetes cluster 430 provides a Kubernetes virtual system ("vsystem") application 440, application instances 460A, 460B, and 470, and data 480A and 480B. The data 480A may be stored in a first data store, and the data 480B may be stored in a separate second data store. A data store is a repository for persistently storing and managing data. Thus, separate data stores may be realized by using separate hardware devices or by using separate databases or other files to store the separate data stores.

Instead of directly requesting an application instance 460A, 460B, or 470 from the Kubernetes API server, the client devices 410A, 410B, and 420 invoke the vsystem application 440. Based on information provided by the client device and the identity of the client device (e.g., unique identifying information for the client device stored in a cookie provided by the Kubernetes API server), a vsystem router component 450 routes the client to an appropriate application instance. In this example, the application instances are instances of Kubernetes containerized applications.

Each application instance is associated with a tenant, and client devices associated with that tenant are routed to the corresponding application instance. Thus, a request by the client device 410A, associated with tenant A, for application A is routed to the corresponding application instance 460A, not the application instance 460B (for tenant B). A request by the client device 410B, associated with tenant B, for the same application is routed to the application instance 460B. Similarly, a request by the client device 420, also associated with tenant B, for the same application is also routed to the application instance 460B. A request by the client device 420 for application B is routed to an application instance associated with tenant B (e.g., the application instance 470).

In some example embodiments, the request by each client device includes a uniform resource locator (URL) that identifies the application being requested. Thus, the request by the client device 410A and the request by the client device 410B may both use the same URL for the requested application but be routed to different instances of the application.

Application instances associated with a tenant may share access to data for that tenant. For example, the application instances 460B and 470 share access to the data 480B. Application instances may be prohibited from accessing data associated with different tenants. For example, the application instance 460A, associated with tenant A, is unable to access the data 480B, associated with tenant B. Likewise, the application instances 460B and 470, associated with tenant B, are unable to access the data 480A, associated with tenant A. Enforcement of the data access controls may be performed at the data store level. In that case, the data 480A is stored in a data store corresponding to tenant A, and the data 480B is stored in a data store corresponding to tenant B. The application instances associated with a tenant are permitted to access the data store corresponding to the tenant but not to access data stores corresponding to other tenants. In some example embodiments, additional data is available to application instances associated with any tenant.

Though the example embodiment of FIG. 4 is described using the Kubernetes vsystem application 440 as a control application that controls the routing of the client devices to application instances, other types of control applications are possible. For example, the control application could execute outside of the Kubernetes environment and select the particular application instance to run within Kubernetes based on the identifier of the client device.

Figure 5:
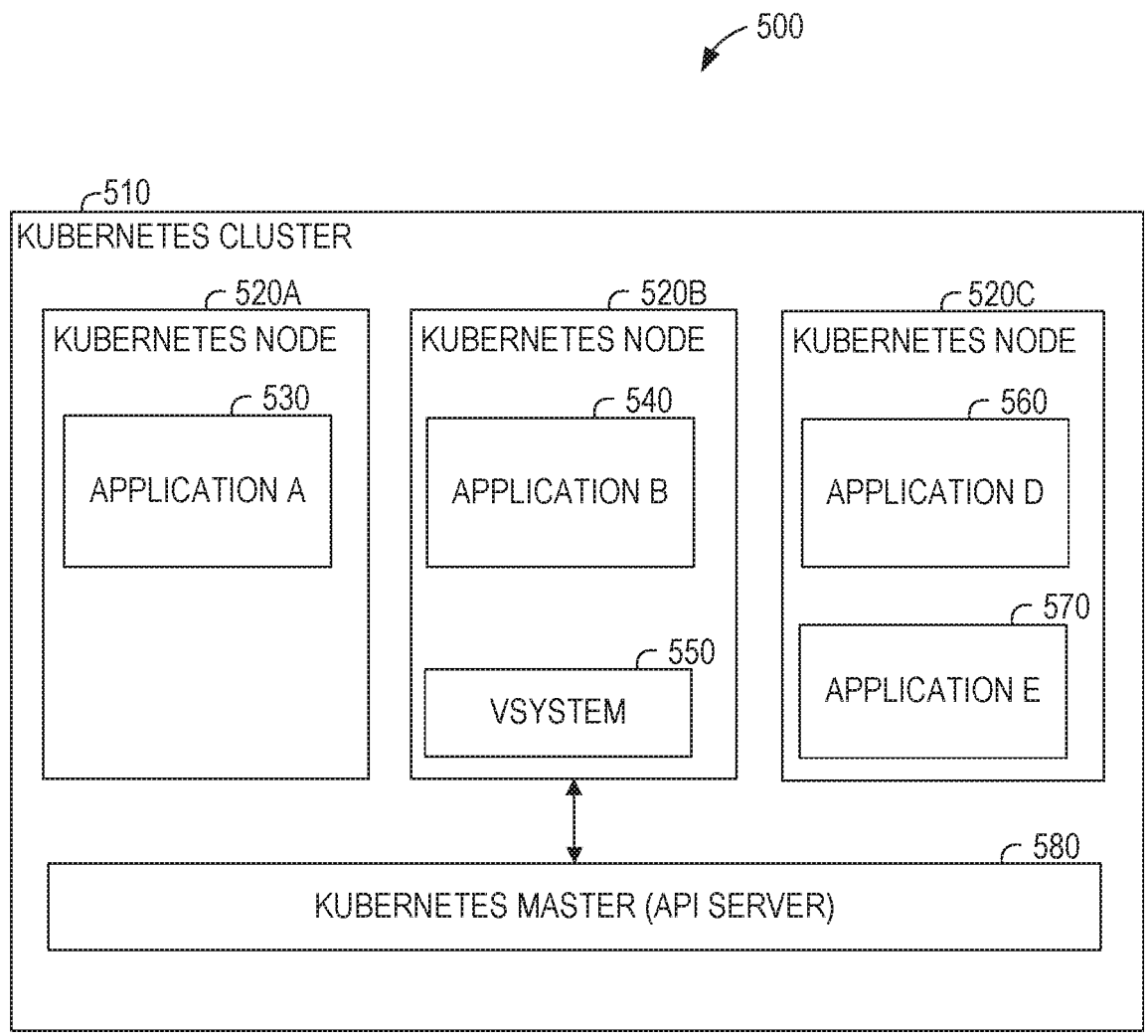
FIG. 5 is a block diagram of Kubernetes nodes in a Kubernetes cluster acting as a distributed operating system that provides a multitenancy/multiuser environment, according to some example embodiments.

FIG. 5 is a block diagram 500 of Kubernetes nodes 520A, 520B, and 520C in a Kubernetes cluster 510 acting as a distributed operating system that provides a multitenancy/multiuser environment, according to some example embodiments. A Kubernetes master 580 of the Kubernetes cluster 510 receives communication requests from client devices to connect to applications hosted on the Kubernetes nodes 520A-520C. As shown in the block diagram 500, the Kubernetes node 520A hosts an application instance 530 of application A; the Kubernetes node 520B hosts an application instance 540 of application B and an application instance 550 of a vsystem; and the Kubernetes node 520C hosts an application instance 560 of application D and an application instance 570 of application E. This illustrates that, from the point of view of the Kubernetes cluster 510, the vsystem is an ordinary Kubernetes application.

After a client device (e.g., the client device 410A of FIG. 4) is connected to the vsystem application instance 550 by the Kubernetes master 580, communications between the client device and the destination application instance (e.g., the application instance 530) may be intermediated by the vsystem application instance 550.

FIG. 6 is a block diagram of a database schema 600 suitable for use in a Kubernetes cluster acting as a distributed operating system that provides a multitenancy/multiuser environment, according to some example embodiments. The database schema 600 includes a tenant table 605, a tenant routing table 620, a routing table 635, and a hash routing table 650. The tenant routing table 620, routing table 635, and hash routing table 650 are alternative implementations, not likely to be used together. The tenant table 605 includes rows 615A, 615B, and 615C of a format 610. The tenant routing table 620 includes rows 630A, 630B, 630C, and 630D of a format 625. The routing table 635 uses a format 640 and includes rows 645A and 645B. The hash routing table 650 includes rows 660A and 660B of a format 655.

The format 610 of the tenant table 605 includes a client identifier field and a tenant identifier field. Thus, the tenant for a client can be determined by looking up the row for the client identifier. In the example of FIG. 6, the client identifier (e.g., an Internet protocol (IP) address) 10.10.1.0 is associated with the tenant identifier A, and the client identifiers 198.1.1.4 and 198.1.1.5 are associated with the tenant identifier B.

The format 625 of the tenant routing table 620 includes a tenant identifier, an application name, and an application instance. Thus, the application instance for the named application for the identified tenant can be determined by looking up the row for the tenant identifier/application name pair. Determining an application instance for a client is thus a two-step process: first the tenant is determined by referring to the tenant table 605, and then the application instance is determined by referring to the tenant routing table 620. The rows 630A-630D show two instances each of a pipeline-modeler application and an accounting application. Each application has a different instance for each tenant.

The rows 645A and 645B of the routing table 635 are in the format 640, including a client identifier, a tenant identifier, an application name, and an application instance. Thus, the routing table 635 combines the elements of the tenant table 605 and the tenant routing table 620. Rows having the same tenant identifier and application name also have the same application instance. The client identifier and application name together form a unique key and can be used to directly identify the application instance (as compared to the two-step process described for the tables 605 and 620).

The format 655 of the hash routing table 650 includes a hash and an application instance. The hash is a hash of data comprising a client identifier and an application identifier (e.g., an application name). In some example embodiments, the client identifier and the application identifier are composed into a string of characters, which is hashed to generate the hash used in the hash routing table 650. For example, the string "10.10.1.0/pipeline-modeler" might be used to generate the hash in the row 660A.

Figure 7:
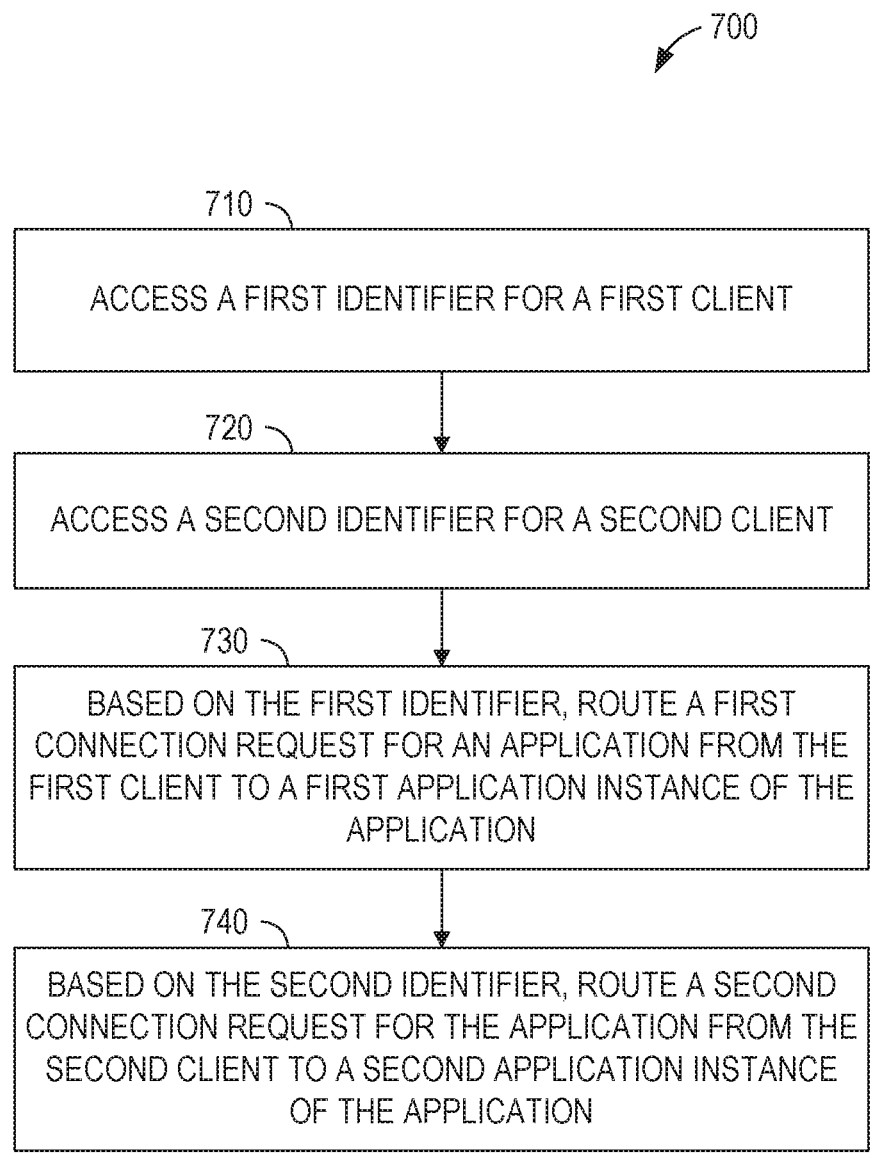
FIG. 7 is a flowchart illustrating operations of a method suitable for using Kubernetes as a distributed operating system for a multitenancy/multiuser environment, according to some example embodiments.

FIG. 7 is a flowchart illustrating operations of a method 700 suitable for using Kubernetes as a distributed operating system for a multitenancy/multiuser environment, according to some example embodiments. The method 700 includes operations 710, 720, 730, and 740. By way of example and not limitation, the method 700 is described as being performed by the devices, modules, and databases of FIGS. 1-6.

In operation 710, the route module 340 accesses a first identifier for a first client. For example, an IP address of the client device 410A may be accessed from packets received from the first client. As another example, a username of a user of the client device 410A may be used as a lookup into a database table to determine that an identifier of the client device 410A is associated with the username. As yet another example, an identifier for the first client may have been stored on the first client (e.g., in a cookie stored by a web page via a web browser) and included as data in packets received from the first client. The cookie may include an identifier of the user, an identifier of the tenant, an identifier of the application, or any suitable combination thereof. In some example embodiments, the cookie is encoded in the JavaScript object notation (JSON) web token (JWT) format.

In operation 720, the route module 340 accesses a second identifier for a second client. For example, an identifier for the client device 410B may be accessed.

Based on the first identifier, the route module 340 routes a first connection request for an application from the first client to a first application instance of the application (operation 730). For example, the connection request from the client device 410A may be routed to the application instance 460A based on the client device 410A being associated with tenant A. In some example embodiments, a hash of the identifier is used to determine the tenant associated with the identifier. For example, a database table using identifier hashes as an index and having tenant identifiers as values may be used by the route module 340.

Based on the second identifier, the route module 340 routes a second connection request for the application from the second client to a second application instance of the application (operation 740). For example, the connection request from the client device 410B may be routed to the application instance 460B based on the client device 410B being associated with tenant B.

Thus, by use of the method 700, two requests from two different clients for the same application are routed to different instances of the application based on the respective identifiers for the two clients.

Figure 8:
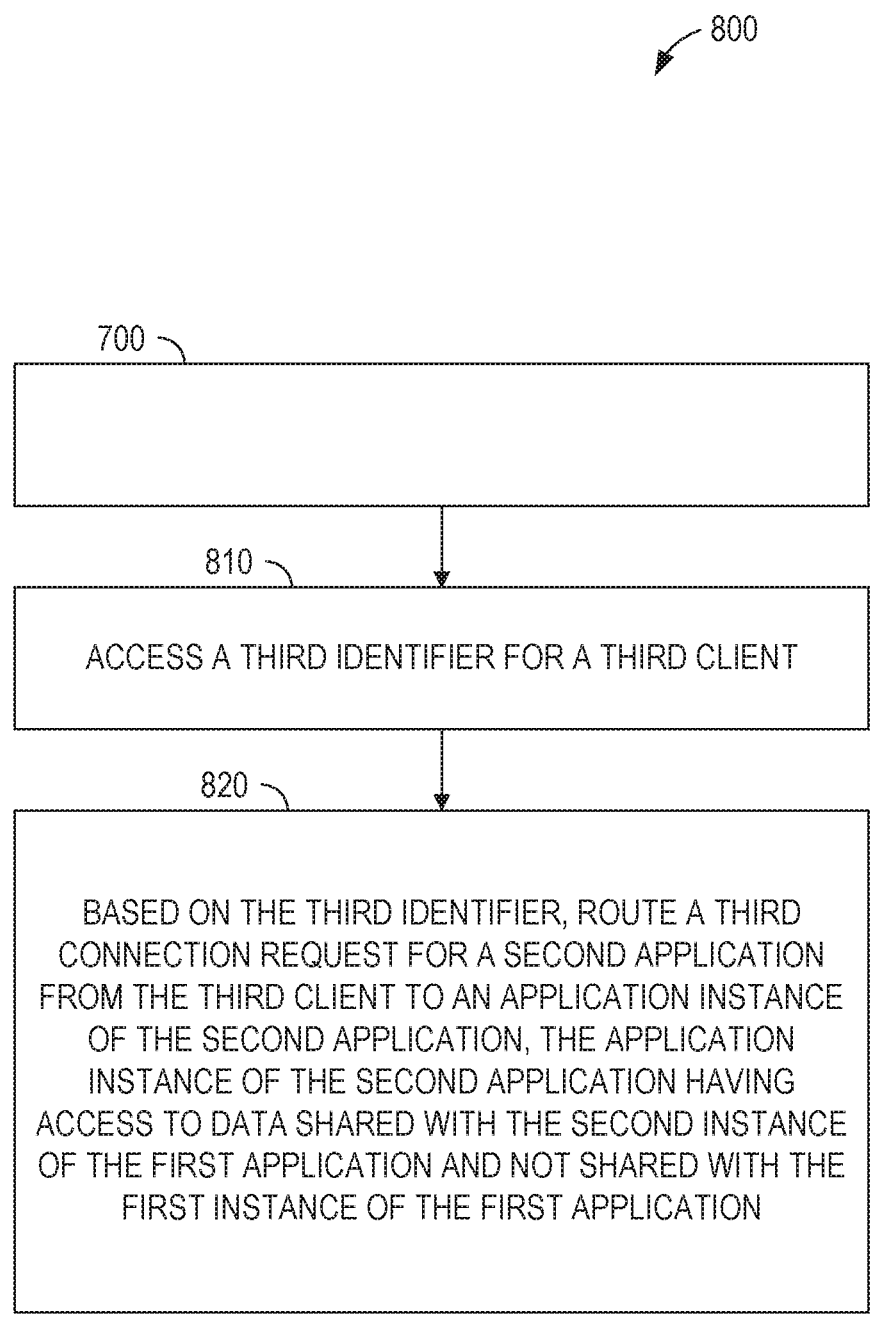
FIG. 8 is a flowchart illustrating operations of a method suitable for using Kubernetes as a distributed operating system for a multitenancy/multiuser environment, according to some example embodiments.

FIG. 8 is a flowchart illustrating operations of a method 800 suitable for using Kubernetes as a distributed operating system for a multitenancy/multiuser environment, according to some example embodiments. The method 800 includes the method 700 (described above with respect to FIG. 7) and operations 810 and 820. By way of example and not limitation, the method 800 is described as being performed by the devices, modules, and systems of FIGS. 1-6. For clarity, "the application" of FIG. 7 is referred to as "the first application" in the discussion of FIG. 8.

In operation 810, the route module 340 accesses a third identifier for a third client. For example, an identifier for the client device 420 may be accessed from a communication from the client device 420 requesting access to a second application. The third identifier may include an indication of a tenant for the third client, or a tenant for the third client may be determined via a database lookup.

Based on the third identifier (e.g., based on the tenant for the third client), the route module 340 routes a third connection request for a second application from the third client to an application instance of the second application (operation 820). The application instance of the second application has access to data shared with the second instance of the first application and not shared with the first instance of the first application. For example, the connection request from the client device 420 may be routed to the application instance 470. As shown in FIG. 4, the application instance 470 has access to the data 480B, which is also accessible by the application instance 460B but is not shared with the application instance 460A.

Thus, by use of the method 800, when the first application and the second application are different applications, two requests from two different clients are routed to two different application instances that share data that is protected from other application instances. Furthermore, by use of the method 800, when the first application and the second application are the same application, the application instance of the second application is the second application instance of the first application, and the two requests from two different clients are routed to the same application instance that has access to data that is protected from other application instances. In some example embodiments, the two different clients are associated with the same tenant, and the other application instances are associated with other tenants.

Figure 9:
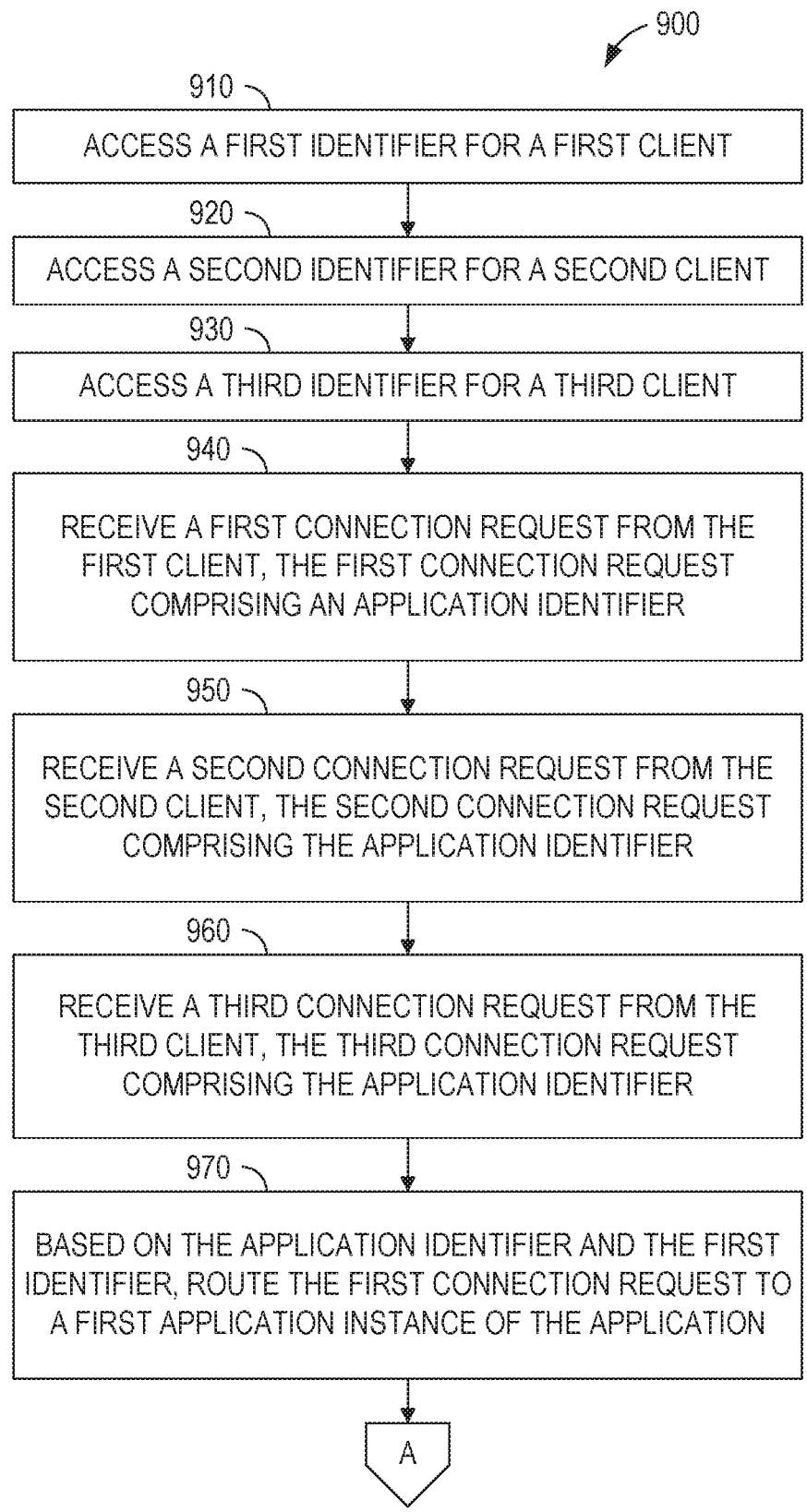
FIGS. 9-10 are a flowchart illustrating operations of a method suitable for using Kubernetes as a distributed operating system for a multitenancy/multiuser environment, according to some example embodiments.
Figure 10:
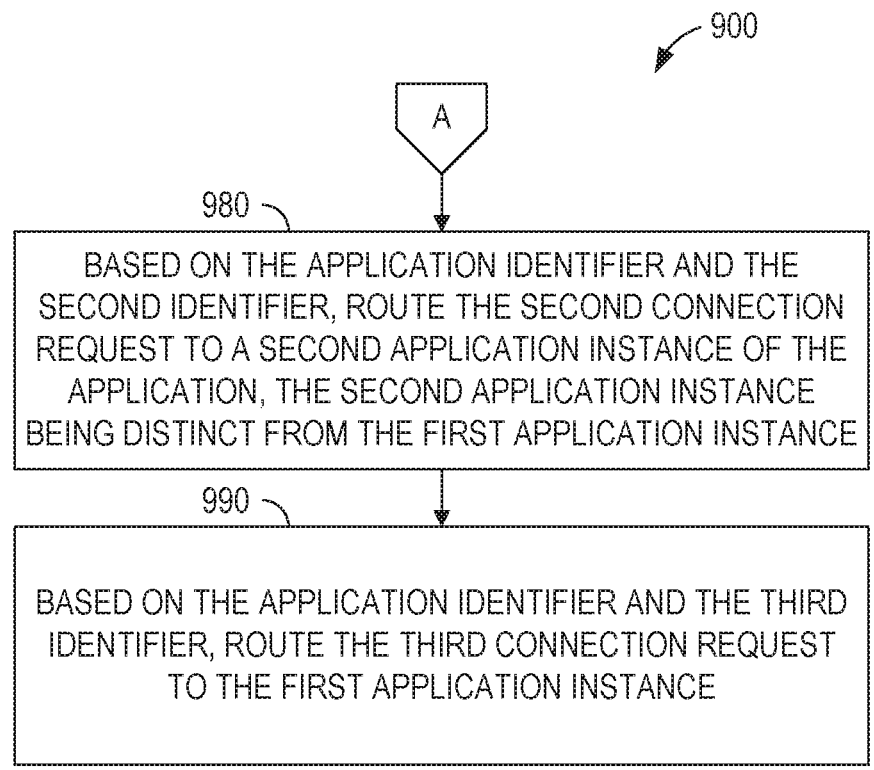

FIGS. 9-10 are a flowchart illustrating operations of a method 900 suitable for using Kubernetes as a distributed operating system for a multitenancy/multiuser environment, according to some example embodiments. The method 900 includes operations 910, 920, 930, 940, 950, 960, 970, 980, and 990. By way of example and not limitation, the method 900 is described as being performed by the devices, modules, and databases of FIGS. 1-6.

In operation 910, the route module 340 accesses a first identifier for a first client. For example, an IP address of the client device 410B may be accessed from packets received from the first client.

In operation 920, the route module 340 accesses a second identifier for a second client. For example, an identifier for the client device 410A may be accessed.

In operation 930, the route module 340 accesses a third identifier for a third client. For example, an identifier for the client device 420 may be accessed. Thus, in this example, the first and third clients are both associated with tenant B and the second client is associated with a different tenant, tenant A.

The route module 240 receives, in operation 940, a first connection request from the first client, the first connection request comprising an application identifier. For example, the first client may request an application using a URL such as http://host.com/ApplicationName.

The route module 240 receives, in operation 950, a second connection request from the second client, the second connection request comprising the application identifier. For example, the second client may request also request the application using the same URL of http://host.com/ApplicationName.

In operation 960, the route module 240 receives a third connection request from the third client, the third connection request comprising the application identifier (e.g., a third request from the third client using the same URL as the first two requests).

Based on the application identifier and the first identifier, the route module 240 routes the first connection request to a first application instance of the application (operation 970). For example, the URL received in the three connection requests may be associated with application A in FIG. 4. and, based on the first identifier of the client device 410B associated with tenant B, the first connection request is routed to the application instance 460B associated with tenant B.

Based on the application identifier and the second identifier, the route module 240 routes the second connection request to a second application instance of the application, the second application instance distinct from the first application instance (operation 980). For example, even though the URL received in the three connection requests are all associated with application A in FIG. 4, based on the second identifier of the client device 410A being associated with tenant A, the second connection request is routed to the application instance 460A associated with tenant A.

In operation 990, based on the application identifier and the third identifier, the route module 240 routes the third connection request to the first application instance. Thus, even though the third identifier of the third client (e.g., the IP address of the third client, the MAC address of the third client, or a unique identifier provided to the third client by the vsystem router component 450) is different from the first identifier of the first client, both connection requests are routed to the application instance 460B associated with tenant B.

Thus, by use of the method 900, two requests from two different clients for the same application are routed to different instances of the application based on the two clients being associated with different tenants and two application requests from two different clients of the same tenant are routed to the same instance of the application.

EXAMPLES

Example 1

A method comprising:

accessing, by a control application executing on one or more processors, a first identifier for a first client;

accessing, by the control application, a second identifier for a second client;

accessing, by the control application, a third identifier for a third client, the third identifier being distinct from the first identifier;

receiving a first connection request from the first client, the first connection request comprising an application identifier;

receiving a second connection request from the second client, the second connection request comprising the application identifier;

receiving a third connection request from the third client, the third connection request comprising the application identifier;

based on the application identifier and the first identifier, routing, by the control application, the first connection request to a first application instance of the application;

based on the application identifier and the second identifier, routing, by the control application, the second connection request to a second application instance of the application, the second application instance being distinct from the first application instance; and based on the application identifier and the third identifier, routing, by the control application, the third connection request to the first application instance.

Example 2

The method of example 1, further comprising:

receiving a fourth connection request from the first client, the fourth connection request comprising a second application identifier; and based on the second application identifier and the first identifier, routing, by the control application, the fourth connection request to an application instance of the second application, the second application being distinct from the first application.

Example 3

The method of example 1 or example 2, further comprising:
receiving the first connection request from the first client, the first connection request comprising a uniform resource locator (URL); and
receiving the second connection request from the second client, the second connection request comprising the URL.

Example 4

The method of any of examples 1 to 3, wherein the routing of the first connection request based on the first identifier comprises:
determining a hash of the first identifier; and
identifying the first application instance based on the hash.

Example 5

The method of any of examples 1 to 4, wherein:
the first application instance accesses first data from a first data store;
the second application instance accesses second data from a second data store;
the first application instance does not have access to the second data store; and
the second application instance does not have access to the first data store.

Example 6

The method of any of examples 1 to 5, wherein the control application is a Kubernetes containerized application.
Example 7
The method of any of examples 1 to 6, wherein the application is a Kubernetes containerized application.

Example 8

A system comprising:
a memory that stores instructions; and
one or more processors configured by the instructions to perform operations comprising:
accessing, by a control application, a first identifier for a first client;
accessing, by the control application, a second identifier for a second client;
accessing, by the control application, a third identifier for a third client, the third identifier being distinct from the first identifier;
receiving a first connection request from the first client, the first connection request comprising an application identifier;
receiving a second connection request from the second client, the second connection request comprising the application identifier;
receiving a third connection request from the third client, the third connection request comprising the application identifier;
based on the application identifier and the first identifier, routing, by the control application, the first connection request to a first application instance of the application;
based on the application identifier and the second identifier, routing, by the control application, the second connection request to a second application instance of the application, the second application instance being distinct from the first application instance; and
based on the application identifier and the third identifier, routing, by the control application, the third connection request to the first application instance.

Example 9

The system of example 8, wherein the operations further comprise:
receiving a fourth connection request from the first client, the fourth connection request comprising a second application identifier; and
based on the second application identifier and the first identifier, routing, by the control application, the fourth connection request to an application instance of the second application, the second application being distinct from the first application.

Example 10

The system of example 8 or example 9, wherein the operations further comprise:
receiving the first connection request from the first client, the first connection request comprising a uniform resource locator (URL); and
receiving the second connection request from the second client, the second connection request comprising the URL.

Example 11

The system of any of examples 8 to 10, wherein the routing of the first connection request based on the first identifier comprises:
determining a hash of the first identifier; and
identifying the first application instance based on the hash.

Example 12

The system of any of examples 8 to 11, wherein:
the first application instance accesses first data from a first data store;
the second application instance accesses second data from a second data store;
the first application instance does not have access to the second data store; and
the second application instance does not have access to the first data store.

Example 13

The system of any of examples 8 to 12, wherein the control application is a Kubernetes containerized application.
Example 14
The system of any of examples 8 to 13, wherein the application is a Kubernetes containerized application.

Example 15

A non-transitory computer-readable medium that stores instructions that, when executed by one or more processors, cause the one or more processors to perform operations comprising:
accessing, by a control application, a first identifier for a first client;
accessing, by the control application, a second identifier for a second client;

accessing, by the control application, a third identifier for a third client, the third identifier being distinct from the first identifier;
receiving a first connection request from the first client, the first connection request comprising an application identifier;
receiving a second connection request from the second client, the second connection request comprising the application identifier;
receiving a third connection request from the third client, the third connection request comprising the application identifier;
based on the application identifier and the first identifier, routing, by the control application, the first connection request to a first application instance of the application;
based on the application identifier and the second identifier, routing, by the control application, the second connection request to a second application instance of the application, the second application instance being distinct from the first application instance; and
based on the application identifier and the third identifier, routing, by the control application, the third connection request to the first application instance.

Example 16

The computer-readable medium of example 15, wherein the operations further comprise:
receiving a fourth connection request from the first client, the fourth connection request comprising a second application identifier; and
based on the second application identifier and the first identifier, routing, by the control application, the fourth connection request to an application instance of the second application, the second application being distinct from the first application.

Example 17

The computer-readable medium of example 15 or example 16, wherein the operations further comprise:
receiving the first connection request from the first client, the first connection request comprising a uniform resource locator (URL); and
receiving the second connection request from the second client, the second connection request comprising the URL.

Example 18

The computer-readable medium of any of examples 15 to 17, wherein the routing of the first connection request based on the first identifier comprises:
determining a hash of the first identifier; and
identifying the first application instance based on the hash.

Example 19

The computer-readable medium of any of examples 15 to 18, wherein:
the first application instance accesses first data from a first data store;
the second application instance accesses second data from a second data store;
the first application instance does not have access to the second data store; and
the second application instance does not have access to the first data store.

Example 20

The computer-readable medium of any of examples 15 to 19, wherein the control application is a Kubernetes containerized application.

Figure 11:
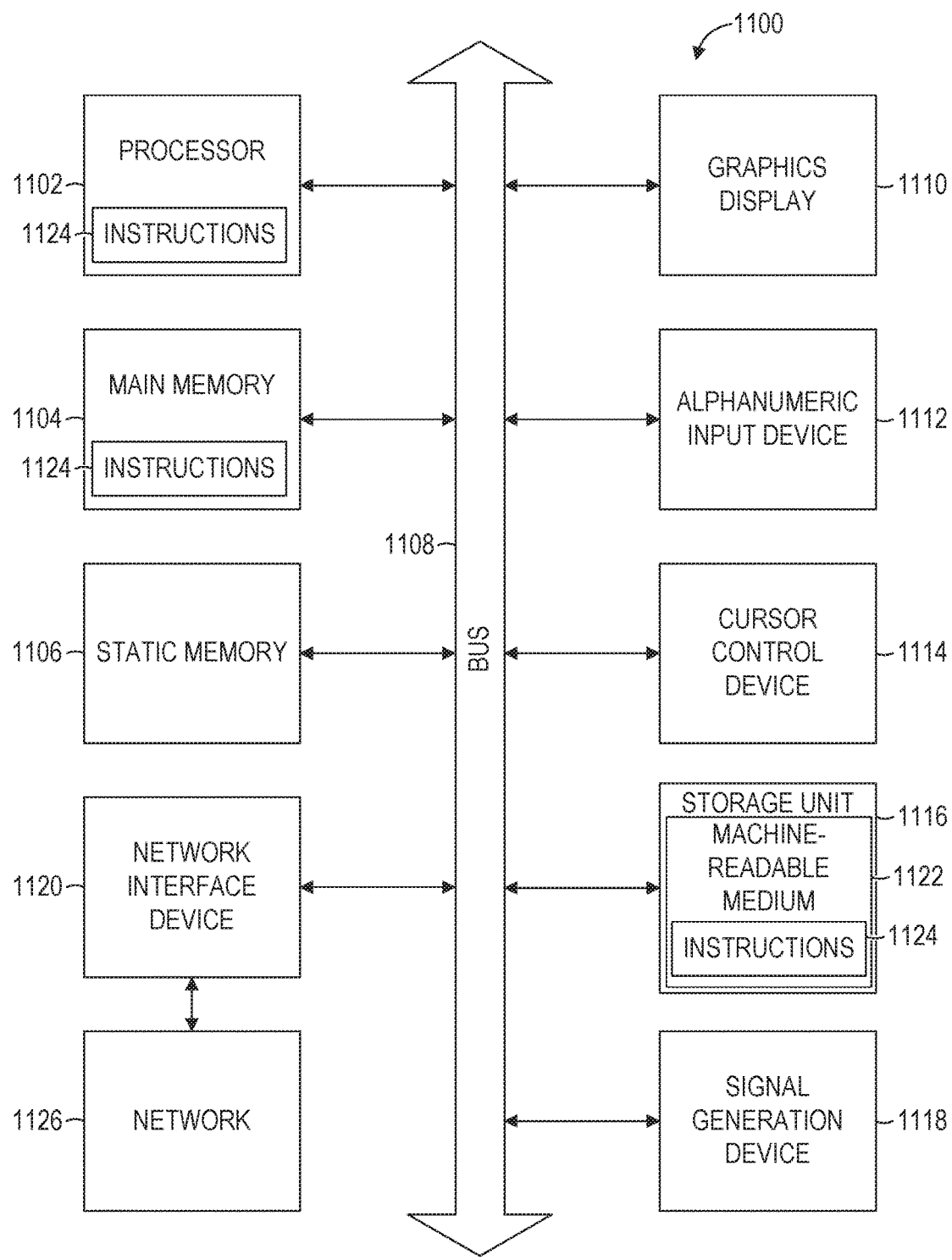
FIG. 11 is a block diagram illustrating components of a machine, according to some example embodiments.

FIG. 11 is a block diagram illustrating components of a machine 1100, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 11 shows a diagrammatic representation of the machine 1100 in the example form of a computer system within which instructions 1124 (e.g., software, a program, an application, an applet, an app, or other executable code) for causing the machine 1100 to perform any one or more of the methodologies discussed herein may be executed, in whole or in part. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include a collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a graphics display 1110 (e.g., a plasma display panel (PDP), a light-emitting diode (LED) display, a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or another pointing instrument), a storage unit 1116, a signal generation device 1118 (e.g., a speaker), and a network interface device 1120.

The storage unit 1116 includes a machine-readable medium 1122 on which are stored the instructions 1124 embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media. The instructions 1124 may be transmitted or received over a network 1126 via the network interface device 1120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown, in an example embodiment, to be a single medium, the term "machine-readable medium" should be taken to include a single medium or multiple media e.g., a centralized or distributed database, or associated caches and servers) able to store instructions. The term "machine-readable medium" shall also be taken to include any medium, or combination of multiple media, that is capable of storing instructions for execution by a machine (e.g., the machine 1100), such that the instructions, when executed by one or more processors of the machine (e.g., the processor 1102), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FGPA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instant in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instant of time and to constitute a different hardware module at a different instant of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
    accessing, by a containerized control application executing on one or more processors, a first identifier for a first client;
    accessing, by the containerized control application, a second identifier for a second client;
    receiving, by the containerized control application, a first connection request from the first client, the first connection request comprising a first application identifier;
    receiving, by the containerized control application, a second connection request from the second client, the second connection request comprising a second application identifier;
    determining based on a first hash of the first identifier, that the first connection request is associated with a tenant;
    determining, based on a second hash of the second identifier, that the second connection request is associated with the tenant;
    based on the first application identifier and the tenant, routing, by the containerized control application, the first connection request to a containerized application instance of a first application that accesses data from a tenant-specific data store associated with the tenant; and
    based on the second application identifier and the tenant, routing, by the containerized control application, the second connection request to a containerized application instance of a second application that accesses the data from the tenant-specific data store associated with the tenant.

2. The method of claim 1, wherein the first application identifier comprises a uniform resource locator (URL).

3. The method of claim 1, wherein the containerized control application is a Kubernetes containerized application.

4. The method of claim 1, further comprising:
    accessing, by the containerized control application, a third identifier for a third client;
    receiving a third connection request from the third client, the third connection request comprising the first application identifier;
    determining, based on a third hash of the third identifier, that the third connection request is associated with a second tenant; and
    based on the first application identifier and the second tenant, routing, by the containerized control application, the third connection request to a second containerized application instance of the first application that accesses data from a second tenant-specific data store associated with the second tenant.

5. The method of claim 1, wherein the determining that the first connection request is associated with the tenant comprises accessing a database that maps the hash of the first identifier to an identifier of the tenant.

6. The method of claim 1, wherein the accessing of the first identifier from the first client comprises accessing a cookie stored on the first client.

7. The method of claim 1, wherein the accessing of the first identifier from the first client comprises accessing an internet protocol (IP) address of the first client.

8. A system comprising:
    a memory that stores instructions; and
    one or more processors configured by the instructions to perform operations comprising:
        accessing, by a containerized control application, a first identifier for a first client;
        accessing, by the containerized control application, a second identifier for a second client;
        receiving, by the containerized control application, a first connection request from the first client, the first connection request comprising a first application identifier;
        receiving, by the containerized control application, a second connection request from the second client, the second connection request comprising a second application identifier;
        determining, based on a first hash of the first identifier, that the first connection request is associated with a tenant;
        determining, based on a second hash of the second identifier, that the second connection request is associated with the tenant;
        based on the first application identifier and the tenant, routing, by the containerized control application, the first connection request to a containerized application instance of a first application that accesses data from a tenant-specific data store associated with the tenant; and based on the second application identifier and the tenant, routing, by the containerized control application, the second connection request to a containerized application instance of a second application that accesses the data from the tenant-specific data store associated with the tenant.

9. The system of claim 8, wherein the first application identifier comprises a uniform resource locator (URL).

10. The system of claim 8, wherein the containerized control application is a Kubernetes containerized application.

11. The system of claim 8, wherein the operations further comprise:

accessing, by the containerized control application, a third identifier for a third client;

receiving a third connection request from the third client, the third connection request comprising the first application identifier;

determining, based on a third hash of the third identifier, that the third connection request is associated with a second tenant; and based on the first application identifier and the second tenant, routing, by the containerized control application, the third connection request to a second containerized application instance of the first application that accesses data from a second tenant-specific data store associated with the second tenant.

12. The system of claim 8, wherein the determining that the first connection request is associated with the tenant comprises accessing a database that maps the hash of the first identifier to an identifier of the tenant.

13. The system of claim 8, wherein the accessing of the first identifier from the first client comprises accessing a cookie stored on the first client.

14. The system of claim 8, wherein the accessing of the first identifier from the first client comprises accessing an internet protocol (IP) address of the first client.

15. A non-transitory computer-readable medium that stores instructions that, when executed by one or more processors, cause the one or more processors to perform operations comprising:

accessing, by a containerized control application, a first identifier for a first client;

accessing, by the containerized control application, a second identifier for a second client;

receiving, by the containerized control application, a first connection request from the first client, the first connection request comprising a first application identifier;

receiving, by the containerized control application, a second connection request from the second client, the second connection request comprising a second application identifier;

determining, based on a first hash of the first identifier, that the first connection request is associated with a tenant;

determining, based on a second hash of the second identifier, that the second connection request is associated with the tenant;

based on the first application identifier and the tenant, routing, by the containerized control application, the first connection request to a containerized application instance of a first application that accesses data from a tenant-specific data store associated with the tenant; and based on the second application identifier and the tenant, routing, by the containerized control application, the second connection request to a containerized application instance of a second application that accesses the data from the tenant-specific data store associated with the tenant.

16. The computer-readable medium of claim 15, wherein the first application identifier comprises a uniform resource locator (URL).

17. The computer readable medium of claim 15, wherein the containerized control application is a Kubernetes containerized application.

18. The computer-readable medium of claim 15, wherein the operations further comprise:

accessing, by the containerized control application, a third identifier for a third client;

receiving a third connection request from the third client, the third connection request comprising the first application identifier;

determining, based on a third hash of the third identifier, that the third connection request is associated with a second tenant; and based on the first application identifier and the second tenant, routing, by the containerized control application, the third connection request to a second containerized application instance of the first application that accesses data from a second tenant-specific data store associated with the second tenant.

19. The computer-readable medium of claim 15, wherein the determining that the first connection request is associated with the tenant comprises accessing a database that maps the hash of the first identifier to an identifier of the tenant.

20. The computer-readable medium of claim 15, wherein the accessing of the first identifier from the first client comprises accessing a cookie stored on the first client.

* * * * *